No. 761,548. PATENTED MAY 31, 1904.
W. N. SHEAFF.
RECEPTACLE FOR LIQUIDS.
APPLICATION FILED OCT. 16, 1903.
NO MODEL.
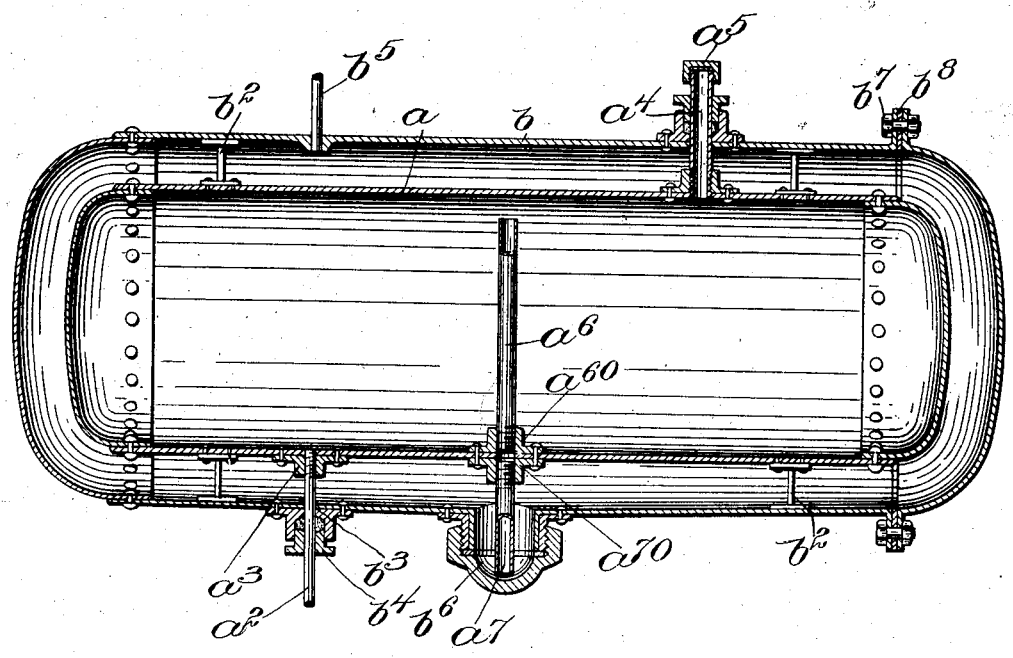
Witnesses:
Jas. J. Maloney.
Nancy P. Fish.
Inventor:
Walter N. Sheaff,
by J. Paul & Livermore
Attys.

No. 761,548. Patented May 31, 1904.

UNITED STATES PATENT OFFICE.

WALTER N. SHEAFF, OF LYNN, MASSACHUSETTS.

RECEPTACLE FOR LIQUIDS.

SPECIFICATION forming part of Letters Patent No. 761,548, dated May 31, 1904.

Application filed October 16, 1903. Serial No. 177,330. (No model.)

*To all whom it may concern:*

Be it known that I, WALTER N. SHEAFF, of Lynn, county of Essex, and State of Massachusetts, have invented an Improvement in Receptacles for Liquids, of which the following description, in connection with the accompanying drawing, is a specification, like letters on the drawing representing like parts.

The present invention relates to a receptacle for liquids, and is intended for use where the liquid is fed from the receptacle under fluid-pressure.

The receptacle embodying the invention is adapted, for example, to be used to contain gasolene for explosive-engines or hydrocarbon-burners, the object of the invention being mainly to obviate the waste as well as the danger attendant upon leakage, which is a source of annoyance with the tanks now commonly in use.

The receptacle embodying the invention comprises a closed chamber provided with an inlet-duct for fluid-pressure projecting upward from the bottom to a point near the top, the said duct also projecting downward beyond the bottom, the downwardly-projecting extension of the duct and the chamber itself being completely inclosed by a supplemental chamber which has at the bottom a well into which the projecting extension of the duct extends. This supplemental chamber is closed except for an inlet for fluid-pressure, such as compressed air, which is commonly used, the pressure entering the main chamber through the duct aforesaid; while any liquid which leaks from the main chamber will be collected in the supplemental chamber, the said liquid accumulating in the well and being forced back into the main chamber by siphonic action.

The main chamber has an outlet at the bottom, which consists of a pipe extending through the wall of the supplemental chamber, the opening through which is securely packed, as by a gland surrounding the said pipe.

The drawing is a longitudinal vertical section of a receptacle embodying the invention.

The main chamber $a$, which holds the liquid, is shown as cylindrical in shape, provided with riveted end members, the said chamber being supported within the supplemental chamber $b$ by means of ribs $b^2$, fastened to the outer wall of the chamber $a$.

The chamber $a$ is provided with an outlet $a^2$, shown as a pipe screwed into a projection $a^3$, secured upon the outer bottom wall of the chamber $a$, the said pipe extending out through an opening $b^3$ in the wall of the chamber $b$ and being securely packed, as by a gland $b^4$. The chamber $a$ is also provided with an inlet-tube $a^4$, similarly secured to the upper wall of the chamber and projecting out through a packing-gland at the top of the chamber $b$, the said inlet-pipe being also securely packed and provided with an air-tight cover $a^5$ to prevent leakage of the fluid-pressure used to feed the liquid from the chamber $a$.

The chamber $b$ is arranged to receive fluid-pressure, having an inlet-pipe $b^5$ which can be connected to any suitable source of fluid-pressure—such, for example, as an air pump or chamber containing compressed air. The fluid-pressure enters the chamber $a$ through the pressure-inlet duct, which is shown as a pipe $a^6$, which projects upward from the bottom of the chamber $a$, terminating at a point near the top thereof, and a pipe $a^7$, which extends below the main lower wall of the chamber $b$ and into a well $b^6$ formed in said lower wall. The pressure therefore passes from the chamber $b$ through the said pipes $a^6$ $a^7$ to the upper portion of the chamber $a$, so as to force the liquid out through the outlet-pipe $a^2$, and any liquid which may leak from the main chamber $a$ will be caught by the supplemental chamber $b$ and will accumulate in the well $b^6$ at the bottom thereof, it being obvious that as soon as the surface of the liquid has risen to a point above the inlet end of the pipe $a^7$ it will be forced back into the chamber $a$ by the pressure.

The invention is particularly useful in connection with automobiles or boats, either steam or gasolene, where explosions frequently take place on account of the slow leakage of gasolene from the storage-tanks.

The outer chamber $b$ is of course made as tight as possible; but even if said outer chamber should leak slightly in places very little of the liquid would escape, since any liquid in said receptacle would tend to accumulate in the well $b^6$, whence it would be forced back into the main chamber $a$.

For convenience in construction the pipes $a^6$ $a^7$ are shown as screwed, respectively, into lugs $a^{60}$ and $a^{70}$, riveted or otherwise secured to the lower wall of the chamber $a$ at opposite sides thereof. One end of the chamber $b$ is shown as flanged, the wall at said end being similarly flanged, so that it can be fastened on, as by bolts $a^7$ with an interposed gasket $b^8$, after the inner chamber has been placed in position. The well portion of the outer chamber, furthermore, is shown as formed with a detachable cap, so that the pipe $a^7$ can be screwed into place after the inner chamber has been placed in position and the cap then screwed or otherwise fastened to complete the outer chamber.

So far as relates to details of construction, however, it is obvious that modifications may be made without departing from the invention.

I claim—

A receptacle for fluid under pressure comprising a main chamber to contain the liquid, said main chamber having a pressure-inlet comprising a duct, the inlet end of which projects below the bottom of said chamber, while the outlet end projects upward in said chamber; a supplemental chamber surrounding said main chamber, said supplemental chamber being provided with an inlet for fluid under pressure; and a well projecting downward from the bottom of said supplemental chamber to contain the inlet end of the pressure-inlet duct to the main chamber.

In testimony whereof I have signed my name to this specification in the presence of two subscribing witnesses.

WALTER N. SHEAFF.

Witnesses:
NANCY P. FORD,
HENRY J. LIVERMORE.